Patented June 3, 1952

2,599,300

UNITED STATES PATENT OFFICE 2,599,300

POLYMERIZATION EMPLOYING AMIDINES HAVING AZO GROUPS

Robert W. Upson, Wilmington, Del., assignor to E. I. du Pont de Nemours and Company, Wilmington, Del., a corporation of Delaware No Drawing. Application June 23, 1950, Serial No. 170,028

7 Claims. (Cl. 260—94.9)

This invention relates to the polymerization of ethylenically unsaturated compounds and more particularly to the polymerization in water systems by means of water soluble azo compounds which contain amidine, i. e., guanyl, groups in the form of their acid salts.

In U. S. 2,471,959 it has been shown that certain organic azo compounds which have an acyclic azo group bonded to aliphatic carbons of a particular character are useful as polymerization initiators, or catalysts, for polymerizable ethylenic compounds. These catalysts have several advantages over the more conventional type which have directly linked oxygen atoms, such as benzoyl and other peroxides. The latter type polymerization initiators provided a source of oxygen which may change the properties of the polymer obtained by discoloration, oxidation of any added modifiers and insolubilization.

The azo compounds disclosed in U. S. 2,471,959 represent a considerable advance in polymerization; however, the compounds disclosed are generally water insoluble particularly in slightly acid media and accordingly not convenient to employ in the direct preparation of polymer dispersions by the polymerization of polymerizable ethylenically unsaturated compounds in water systems at relatively low temperatures.

It is disclosed in U. S. application Serial No. 757,682, filed June 27, 1947, now U. S. Patent 2,520,338 that carboxylic groups be introduced in one of the hydrocarbon chains of the azonitriles. The akali metal salts of such carboxylic azonitriles have some solubility in aqueous systems which are neutral to basic. However, it has been found that these compounds are not soluble in aqueous acidic solutions. Acidic solutions are preferable for many polymerization reactions, particularly those involving olefinic hydrocarbons and certain acrylic compounds, to obtain superior properties in the resulting polymers.

In general, the use of peroxy and other prior art polymerization catalysts in the polymerization of ethylene in aqueous media has resulted in formation of a coagulated polymer. For many uses, a dispersion of ethylene polymer in water would be an advance in the art provided the dispersion was of sufficient concentration, e. g., above 15% of polymeric ethylene, and of high quality, e. g., high molecular weight but relatively free from crosslinking. Such a dispersion possesses utility in the preparation of coatings and similar uses by the evaporation of water from the dispersion. Conventional prior art catalysts employed in the preparation of dispersions have generally required too high a temperature to produce high quality polymer in dispersed form.

This invention has as an object a new process of polymerization. A further object is the provision of new polymerization systems. Other objects will appear hereinafter.

These objects are accomplished by the invention of the process wherein a monomer subject to addition polymerization and having a non-aromatic ethylenic group, preferably terminal, is polymerized by bringing the monomer in contact with an organic azo compound wherein the azo —N=N— group is acyclic and bonded from both of the nitrogens to discrete carbons which are aliphatic and at least one and generally both of which discrete carbons are tertiary and have as one of the groups attached to the tertiary carbon a guanyl radical in the form of an inorganic acid salt. These azo amidine catalysts are particularly useful in the preparation of polymer dispersions in aqueous media. The preferred compounds are thus acid salts of dialkyldiguanylazoalkanes in which the alkyl radicals are lower alkyls, particularly of from one to four carbons, for use in the polymerization.

In general these compounds may be prepared by the treatment of an azonitrile, e. g., alpha,-alpha'-azodiisobutyronitrile, in an anhydrous system with an alcohol, hydrogen halide and a hydrogen-bearing amine of the formula $HNR_2$ where R is hydrogen or an organic radical, generally hydrocarbon, of one to six carbons. These compounds are generally employed in amounts of from 0.1 to 5% based on the weight of ethylenically unsaturated compound in an aqueous medium at temperatures of from 40–90° C. and generally in the presence of a surface-active agent.

The following examples in which parts are by weight are illustrative of the invention.

*Example I*

A solution of ten parts of purified commercial sodium dodecylsulfate and four parts of disodium hydrogen phosphate in 200 parts of distilled oxygen-free water was prepared under nitrogen. This solution was cooled in ice and one part of the hydrochloride of 2,2'-diguanyl-2,2'-azopropane was added. The resulting mixture was charged in a stainless steel-lined rocker bomb capable of holding 1000 parts of water. The bomb was then flushed with nitrogen and evacuated. Ethylene was added until the total pressure was 500 atmospheres. The contents of the bomb were heated to 70° C. and the pressure then raised to 900 atmospheres by the addition of more ethylene. The reaction mixture was agitated by rocking the bomb for two hours while the temperature was maintained at 70° C. At the end of this period the temperature was lowered and the ethylene bled off. The reaction mixture (which corresponded in volume to 210 parts of water) at this point was a transparent liquid with a bluish cast. A portion (weighing about 110 parts) of this material was acidified by the addition of dilute nitric acid and then heated to boiling until the ethylene polymer was completely coagulated. The polymer was removed by filtration and washed with acetone and water, then air dried to give 27.5 parts of white powder which corresponds to a solids content of 25% in the original dispersion. The ethylene polymer had an inherent viscosity of 0.58 as determined on a 0.1% solution in xylene at 85° C.

*Example II*

The procedure of Example I was repeated except that the reaction time was four hours at 65° C. and no disodium hydrogen phosphate was present. The volume of dispersion isolated corresponded (in volume) to 228 parts of water; the solids content was 27.5% and the ethylene polymer had an inherent viscosity of 0.50.

*Example III*

A mixture comprising 20 parts of acrylonitrile, 80 parts of distilled water, and 0.075 part of the hydrochloride of 2,2'-diguanyl-2,2'-azopropane was charged in a glass vessel, which was flushed with nitrogen and sealed. The vessel was placed in a bath at 65° C. with agitation and at the end of 20 hours, 20 parts of polyacrylonitrile was obtained. The polymer had an inherent viscosity of 6.28.

*Example IV*

The general procedure of Example III was repeated except that the monomer system consisted of 19 parts of acrylonitrile and one part of dimethylaminoethyl methacrylate and the polymerization time was 18 hours at a pH of 9.35. There was obtained 13.2 parts (65% conversion) of polymer which had an inherent viscosity of 2.7.

*Example V*

A mixture consisting of 186 parts of water, 12.3 parts of acrylonitrile, 0.7 part of dimethylaminoethyl methacrylate, and 0.07 part of the hydrochloride of 2,2'-diguanyl-2,2'-azopropane was adjusted to a pH of 3.93 with sulfuric acid; charged in a glass vessel, flushed with nitrogen and sealed. After 70 minutes at 65° C. there was obtained a 66% conversion to a polymer which had an inherent viscosity of 3.84.

*Example VI*

A glass container was charged with 20 parts of water, 16 parts of acrylonitrile and 0.2 part of the hydrochloride of 2,2'-diguanyl-2,2'-azobutane. As soon as the temperature was raised to 60° C. rapid polymerization took place.

*Example VII*

The general procedure of Example VI was repeated except that the azo compound was 2,2'-bis(N,N-diethylguanyl)-2,2'-azopropane. A white polymer was obtained.

*Example VIII*

When the general procedure of Example VI was repeated except that the azo compound employed was 2,2'-bis(N-hydroxyethylguanyl)-2,2'-azopropane, polymerization also occurred.

*Example IX*

A glass vessel was charged with 11.6 parts of allyl alcohol, 10.6 parts of acrylonitrile, 50 parts of water and 0.1 part of 2,2'-diguanyl-2,2'-azopropane. After heating for 16 hours at 60° C., a total of 3.8 parts of polymer was obtained which contained 73.7% acrylonitrile.

*Example X*

A mixture of 100 parts of 2-chlorobutadiene, 4 parts of Nancy wood rosin and 0.4 part of dodecyl mercaptan was added to a solution containing 157 parts of distilled copper-free water, 1.15 parts of sodium hydroxide, 0.6 part of "Daxad" 11 (a dispersant and 1.5 parts of 2,2'-diguanyl-2,2'-azopropane. The resultant emulsion was stirred under nitrogen for 25 minutes at 60° C. The polymerization was stopped by the addition of a small amount of an emulsion containing p-tertiary-butylcatechol and phenothiazine. The polymer was isolated by coagulation with methanol and brine and the plastic tacky rubber washed and dried on a mill at 50–60° C. There was obtained 38 parts of polymer.

*Example XI*

A glass vessel was charged with 34 parts of methyl hydrogen maleate, 27 parts of acrylonitrile, 740 parts of water and 0.3 part of 2,2'-diguanyl-2,2'-azopropane. After five hours at 65° C. a 20% conversion to polymer was obtained. The polymer had an inherent viscosity (0.2% solution in dimethylformamide) of 1.62 and had a softening temperature of 190° C. The product contained 24.64% nitrogen corresponding to a copolymer containing 6% methyl hydrogen maleate.

A preferred system of the present invention wherein ethylene is polymerized in aqueous media employing the azoamidines of this invention as catalysts is illustrated in Example XII below.

*Example XII*

A solution of six parts commercial "Triton" X100, 300 parts of copper-free, deoxygenated water and 30 parts of tertiary butyl alcohol was prepared and charged under nitrogen at room temperature to a rocker bomb having a stainless-steel liner and a capacity of 1500 parts by weight of water; 0.5 part of the hydrochloride of 2,2'-diguanyl-2,2'-azopropane was added to the bomb which was then flushed with nitrogen, closed, and evacuated. Ethylene was added (565 atmospheres of pressure) to the bomb which was then heated to an internal temperature of 65° C. Additional ethylene was charged to the bomb till a pressure of 970 atmospheres was obtained. The reaction mixture was then agitated by rocking for a period of six hours while the temperature was maintained at 65° C. and the pressure was held between 900 and 1000 atmospheres by repressuring with ethylene. A total pressure drop of 155 atmospheres was recorded during the reaction period. At the end of the reaction the bomb was cooled and the excess ethylene was bled off. A milky-white, fluid liquid was recovered. Assay of the dispersion indicated the presence of 11.3% solids and electron photomicrographs indicated that the dispersed particles were spheroidal and approximately 0.1 micron in diameter. A portion of the liquid was treated with a large volume of acetone and the coagulated polymer was filtered, washed with acetone and water, and dried. This material had an inherent viscosity of 1.58 as determined on a solution containing 0.1 g. polymer/100 cc. of xylene at 85° C. A film pressed at about 140° C. was very flexible and orientable.

The present invention is generic to the polymerization of ethylenic monomers subject to addition polymerization, employing as the initiator or catalyst, a soluble acid salt of an azo compound which contains a guanyl radical attached to a tertiary carbon which carbon is further attached to an acyclic azo group. The following general formula shows the preferred compounds:

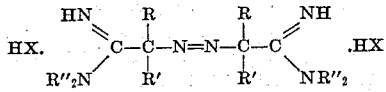

wherein R and R'=alkyl radicals of one to four carbons, e. g., methyl, ethyl, n-butyl, and R''=H, or a monovalent organic radical of one to six carbons, e. g., methyl, butyl, hexyl, phenyl, while HX represents an inorganic acid and suitably a hydrogen halide. In a further preferred embodiment, these compounds are saturated, i. e., free from carbon to carbon unsaturation, and are hydrocarbon except for the azo and guanyl nitrogens and the acid. The invention is thus applicable inter alia to the hydrochlorides and hydrobromides of 2,2'-bis(N-phenylguanyl)-2,2'-azopropane, 2,2'-bis(N,N-dimethylguanyl)-2,2'-azobutane, 3,3'-bis(N,N-di-n-zutylguanyl)-3,3'-azopentane, and 5,5'-diguanyl-5,5'-azononane, to mention but a few. Inorganic acid salts other than the hydrobromide and hydrochloride may be prepared from these hydrohalides by double decomposition with, for example, lead nitrate, silver fluoride, or by freeing the amidine base with the use of alkali followed by acidification of the base with the appropriate acid, e. g., hydriodic, sulfuric, etc.

The azo catalysts of this invention can be prepared by a process comprising (a) reaction in an anhydrous alkanol of hydrogen chloride or hydrogen bromide with an organic azo compound wherein the azo, —N=N—, group is acyclic and bonded from both its nitrogens to discrete carbons one at least of which is tertiary and has attached to it a nitrile group, (b) separation of the salt thus obtained, and (c) treatment with a hydrogen-bearing amine including ammonia, aniline, diphenylamine, diethylamine, in alkanol medium. The above reactions are carried out under anhydrous conditions and at temperatures of generally in the range of −10 to 30° C. This preparation is exemplified in my copending application Serial No. 170,027, filed of even date herewith, wherein the azo amidines are claimed as new compounds. The preferred azonitriles are saturated and are hydrocarbon except for the nitrile and azo nitrogens.

Azonitriles from which the guanyl salts are prepared can be obtained by the procedure of Thiele and Heuser, Ann., 1–43 (1896), Dox, J. Am. Chem. Soc. 47, 1471–1477 (1925) and Alderson and Robertson U. S. 2,469,358.

The amount of the azo catalyst employed can vary within wide limits although generally 0.05 to 5% based on the weight of monomer and preferably 0.1 to 2% are employed.

The temperature of polymerization should not exceed 100° C. and should be more than 25° C. The preferred temperature depends upon the particular azo catalyst but is generally 50–80° C.

The amount of water present during the polymerization can vary widely. However, to obtain relatively concentrated dispersions of the polymeric material for use, the ratio of water to polymerizable monomer is generally within the range of 3 to 20 per part of monomer that is converted to polymer.

The particular surface-active agent or dispersant employed, if any, is subject to wide variation. In fact any of the three different types, i. e., nonionic, anionic, and cationic, may be employed. The precise amount employed in systems in which the polymerizable monomer is insoluble depends upon the activity of the dispersant. Amounts of 1 to 10% are generally employed.

Liquid conditions are desired for the polymerization of this invention and polymerizations in which the monomer is a gas require pressure. Thus ethylene polymerizations generally are effected at pressures of from 100 to 7500 atmospheres.

In that modification of the invention represented by Example XII above the polymerization system includes not only the monomer, catalyst, and initiator, but also a water-miscible organic solvent and a dispersing agent. The water-miscible organic solvent is present in amounts of 5 to 30% of the weight of water employed. Particularly suitable are the lower aliphatic (1 to 4 carbon) alcohols and particularly the alkanols such as methanol and tertiary butyl alcohol. Although anionic (e. g., sodium lauryl sulfate) or cationic dispersing agents may be employed, nonionic dispersants are preferred, such as polyethylene oxide derivatives of phenols (e. g., "Triton" X100). The amount of dispersant present may vary considerably but is generally at least 1% and may be 3% or more based on the amount of water employed.

The products obtained by the process of Example XII have superior properties, i. e., the emulsions can be used directly or the polymer can be isolated and fabricated into films or molded objects. These polymers are orientable and exhibit outstanding flexibility. Viscosity of the polymer solutions in hot xylene is high.

The process of this invention is of generic application to the addition polymerization of polymerizable compounds having the non-aromatic ethylenic,

group. It is particularly applicable to monomeric unsaturated polymerizable compounds in which the unsaturation is due to a terminal ethylenic group which is attached to a negative radical. It is thus applicable to polymerizable vinylidene compounds, including vinyl compounds and particularly preferred are those which contain the

group.

Compounds having a terminal methylene, $CH_2=$, group which are subject to polymerization and copolymerization with the initiators of this invention include olefins, e. g., ethylene, isobutylene; acrylyl and alkacrylyl compounds, e. g., acrylonitrile, methyl acrylate, ethyl methacrylate, methacrylic acid, methacrylamide; vinyl and vinylidene halides, e. g., vinyl chloride, vinylidene chloride; vinyl carboxylates, e. g., vinyl acetate, vinyl trimethylacetate; vinyl imides, e. g., N-vinylphthalimide; N-vinyllactams, e. g., N-vinylcaprolactam; vinyl aryls such as styrene and other vinyl derivatives such as the vinylpyridines, methyl vinyl ketone and vinyl ethyl ether.

Fluoroethylenes including vinyl fluoride and particularly polyfluoroethylenes, including tetrafluoroethylene, chlorotrifluoroethylene and 1,1-dichloro-2,2-difluoroethylene may be polymerized and copolymerized by the process of this invention.

Polymerizable compounds that have a plurality of ethylenic double bonds that similarly may be polymerized or copolymerized include those having conjugated double bonds, such as butadiene and 2-chlorobutadiene, and compounds which contain two or more double bonds which are isolated with respect to each other, such as ethylene glycol dimethacrylate, methacrylic anhydride, diallyl maleate and divinylbenzene.

In addition to copolymers obtainable from the classes of monomers mentioned above, the copolymerization of fumaric or maleic esters, carbon monoxide, sulfur dioxide, and/or acetylene with types of monomers mentioned, can be effected by the process of this invention. Furthermore, the term "polymerization" includes within its scope (in addition to the polymerization of a monomer alone or of two or more monomers, i. e., copolymerization) the polymerization of unsaturated monomers in the presence of chain transfer agents, e. g., carbon tetrachloride. This latter process has been called "telomerization." See U. S. 2,440,800.

This invention is applicable to the polymerization of any unsaturated compound subject to addition polymerization by prior techniques. Optimum conditions may vary from monomer to monomer, and since liquid phase polymerization is desired, gases such as ethylene and propylene require pressure.

The process of this invention is particularly useful for the preparation of dispersions of fusible polymers and particularly of ethylene polymer. The dispersions can be used for casting of film and preparation of coatings or applying the polymer dispersions to cloth, paper, etc. In view of the absence of peroxy catalyst residues, the films thus obtained are of superior quality.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the addition polymerization of ethylenically unsaturated monomers subject to addition polymerization, the improvement wherein the monomer is brought in aqueous dispersion into contact with, as an initiator of the polymerization, an inorganic acid salt of an organic azo compound wherein the acyclic azo, —N=N—, group is bonded to two discrete aliphatic carbons one, at least, of which is tertiary and bonded to a guanyl radical.

2. In the addition polymerization of ethylenically unsaturated monomers subject to addition polymerization, the improvement wherein the monomer is brought in aqueous dispersion into contact with, as an initiator of the polymerization, an inorganic acid salt of an aliphatic azo compound of the formula

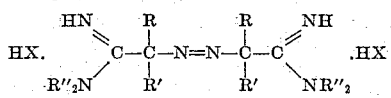

wherein R and R' are alkyl radicals of one to four carbons, R'' is selected from the class consisting of hydrogen and organic radicals of one to six carbons and HX is an inorganic acid.

3. In the addition polymerization of ethylenically unsaturated monomers subject to addition polymerization, the improvement wherein the monomer is brought in aqueous dispersion into contact with, as an initiator of the polymerization, an inorganic acid salt of an aliphatic azo compound wherein the acyclic azo, —N=N—, group is bonded to two discrete tertiary aliphatic carbons each bonded to a guanyl radical.

4. Process of claim 3 wherein the guanyl radical of the azo compound is unsubstituted and the aliphatic azo compound in free base form is saturated hydrocarbon except for the azo and guanyl nitrogens.

5. Process of claim 3 wherein the azo compound in free base form is 2,2'-diguanyl-2,2'-azopropane.

6. Process of claim 2 wherein the monomer is ethylene.

7. Process of claim 5 wherein the monomer is ethylene.

ROBERT W. UPSON.

REFERENCES CITED

The following references are of record in the file of this patent:

UNITED STATES PATENTS

| Number | Name | Date |
|---|---|---|
| 2,471,959 | Hunt | May 31, 1949 |